(12) United States Patent
Jiang

(10) Patent No.: US 6,774,950 B1
(45) Date of Patent: Aug. 10, 2004

(54) DISPLAYING VIDEO IMAGES

(75) Inventor: Hong Jiang, El Dorado Hills, CA (US)

(73) Assignee: Intel Corporation, Santa Clara, CA (US)

(*) Notice: Subject to any disclaimer, the term of this patent is extended or adjusted under 35 U.S.C. 154(b) by 355 days.

(21) Appl. No.: 09/607,834

(22) Filed: Jun. 30, 2000

(51) Int. Cl.⁷ .................................................. H04N 5/08
(52) U.S. Cl. .................................................. 348/526
(58) Field of Search ........................... 713/1; 345/546, 345/582, 423; 710/53; 348/526, 555, 446, 565; 386/94, 95

(56) References Cited

U.S. PATENT DOCUMENTS

| | | | | |
|---|---|---|---|---|
| 5,247,359 A | * | 9/1993 | Okada et al. | 348/526 |
| 5,416,601 A | * | 5/1995 | Wilkinson | 386/95 |
| 5,764,240 A | * | 6/1998 | Herz | 345/546 |
| 5,801,788 A | * | 9/1998 | Ashida et al. | 348/588 |
| 5,850,572 A | * | 12/1998 | Dierke | 710/53 |
| 6,311,268 B1 | * | 10/2001 | Chu | 713/1 |

* cited by examiner

Primary Examiner—Matthew C. Bella
Assistant Examiner—Dalip K. Singh
(74) Attorney, Agent, or Firm—Fish & Richardson P.C.

(57) ABSTRACT

Displaying video images includes determining which of at least two video field polarities a video display is in a state to display and choosing a stored video field for display based on the determined state.

20 Claims, 4 Drawing Sheets

DISPLAYING VIDEO IMAGES

BACKGROUND

This invention relates to displaying video images.

Each video image in a sequence of video images displayed on an interlaced display device consists of two fields of data: one field contains the even lines and the second field contains the odd lines of the video image. The difference between these two fields (polarities) is positional and temporal. In order to properly display the sequence of video images on the interlaced display device, e.g., in a simultaneous video capture and television (TV) output operation, the polarity of the video image should match the polarity of the display device. That is, the even lines of a video image should be sent to the display device when the display device is displaying an even lines field and the odd lines of the video image should be sent to the display device when the display device is displaying an odd lines field. Because the source of the sequence of video images and the display device can have independent timing, this field synchronization may not always exist. One way to achieve this synchronization is by genlocking the display device to the source of the video images using a genlocking device. The genlocking device enables the display device to lock onto and synchronize itself with the incoming sequence of video images.

DESCRIPTION

Figure 1:
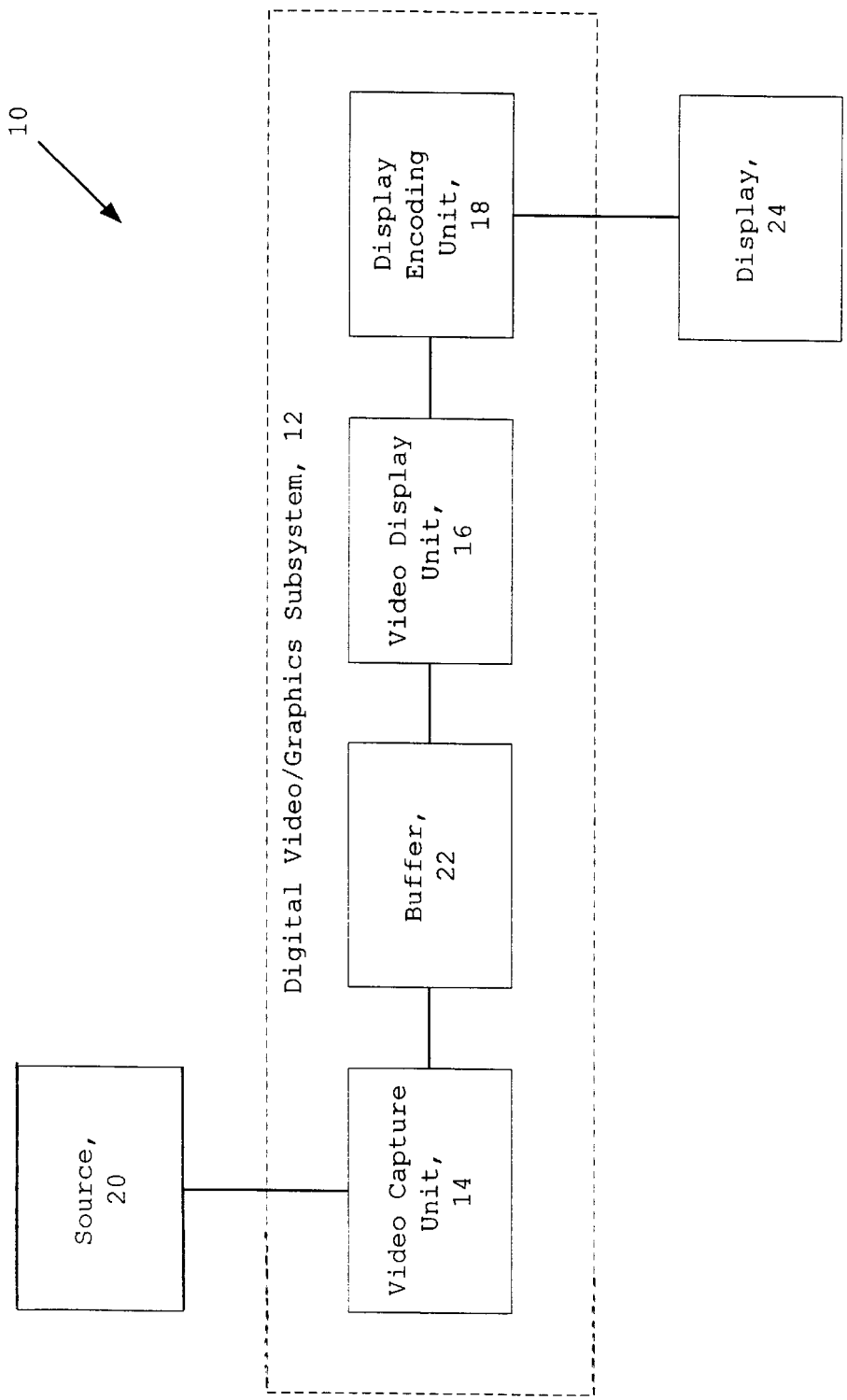
FIGS. 1–2 are block diagrams of a field locking apparatus in accordance with an implementation of the invention.

Referring to FIG. 1, a digital video system 10 including a graphics subsystem 12 with video capture capabilities for a computer includes a video capture unit 14, a video display unit 16, and a display encoding unit 18. (The display encoding unit 18 may instead be external to the subsystem 12.) The video capture unit 14 synchronizes the graphics subsystem 12 to the incoming video timing, samples the incoming video data, and stores the samples in a memory storage unit, e.g., a frame buffer 22.

The storage format of the video data in the frame buffer 22 is either a buffer per field or a buffer per two fields (called a frame). After a complete buffer is filled, the video capture unit 14 adjusts memory buffer pointers (not shown) that point to buffers included in the frame buffer 22 to a different location for the next incoming video field. This way, complete video fields can be stored in the frame buffer 22.

Multiple buffers in the frame buffer 22 can be used to store incoming, contiguous video fields. The multiple buffers can be used as a ring buffer so that the incoming video fields are stored one at a time into this set of buffers. When the captured video fields are consumed at the same speed as the video data capture, the captured video fields do not overlap. The multiple buffers can also serve as a timing adjustment in case that the consumption rate varies, e.g., the buffers in the frame buffer 22 help the graphics subsystem 12 perform synchronization functions.

The video capture unit 14 also provides other information about the incoming video data to the display unit 16. The information can include field or frame start or complete time, sequence (order) of the incoming video fields, buffer location of each captured video field, etc. Here, video consumption (consuming video fields stored in the frame buffer 22 before they are overwritten by other video fields sent by the video capture unit 14) can be storing the video fields into other storage media, such as hard disks or other digital video channels such as Firewire (1394) cable, or can be displaying the video fields on a display device 24, e.g., a progressive computer monitor or an interlaced TV monitor.

In displaying the video fields, there are two aspects of field locking to enable the display device 24 to lock onto and synchronize with an incoming sequence of video images from the source 20. The first one is field frequency locking and the second one is field polarity locking.

For field frequency locking, the display timing, particularly the display field refresh timing, is synchronized to the source video data. This synchronization can be achieved through a phase lock loop (PLL), a pixel clock, or scan line adjustment. Field frequency locking is needed even for progressive graphics or video data. In fact, for a computer system that normally outputs to a progressive display device such as a computer monitor, supporting an interlaced TV output would require field frequency locking. Television monitors normally have frequency restrictions. For example, an NTSC (National Television Standards Committee) TV set would require a field refresh rate of 59.94 Hz and a PAL (Phase Alternating Line) TV set would require a field refresh rate of 50 Hz. In order to display computer content on a TV set, the video display unit 16 locks to the field frequency of the TV encoder unit 18.

For field polarity locking, data of even fields are displayed at the display even field refresh rate and data of odd fields are displayed at the display odd field refresh rate. This scheme is based on a condition that the display unit 16 is already locked to the field frequency of the TV encoder unit 18. Here, the TV encoder unit 18 has its own refresh frequency and its own field polarity.

Figure 2:
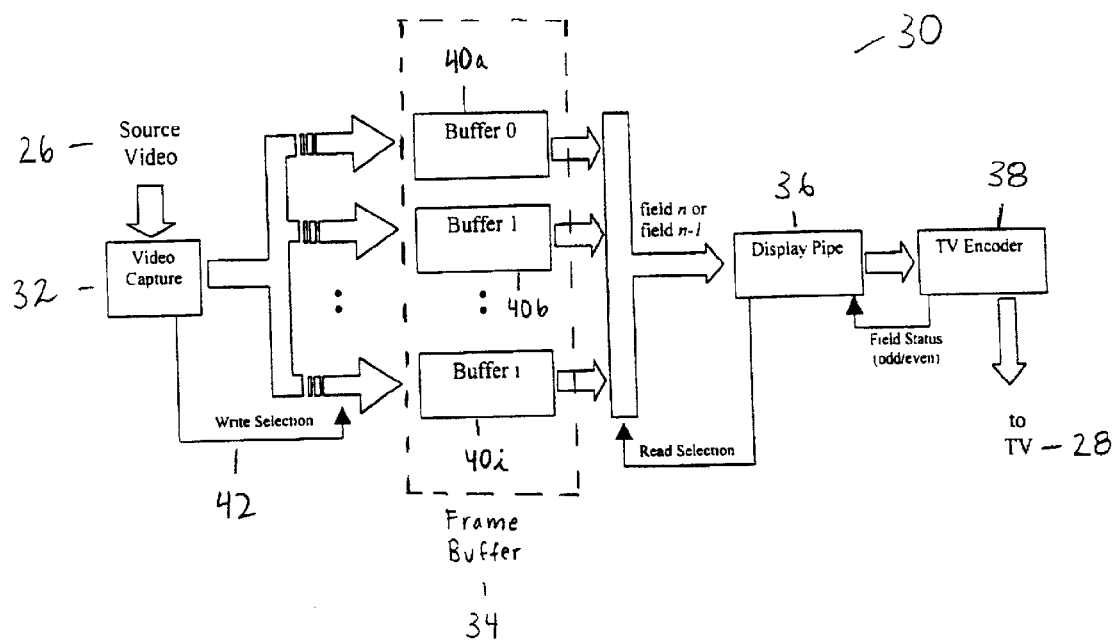

Referring to FIG. 2, one way to achieve field synchronization is by field locking a video field from a source 26 for display on a display device 28, e.g., a television or a computer monitor, using a graphics controller 30. The graphics controller 30 may enable this field locking feature through a single register bit. Each video field in a sequence of video images enters the graphics controller 30 through a video capture unit 32 and is stored in a frame buffer 34. A display pipe 36 determines which stored video field to display on the display device 28 based on the field status of the display device 28 as indicated by an encoder 38.

Figure 3:
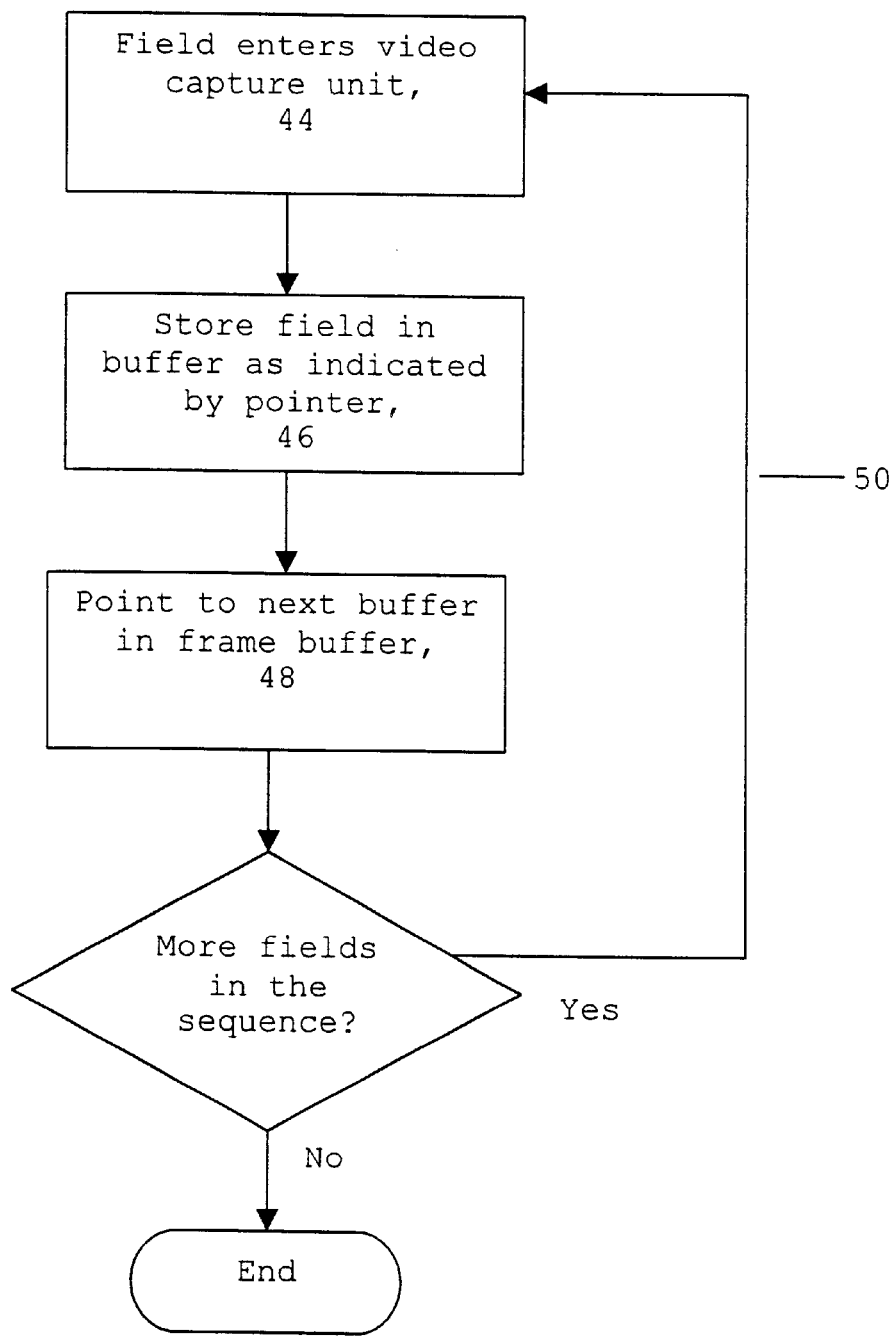
FIG. 3 is a flowchart showing a process of storing video fields.

Referring to FIGS. 2 and 3, the sequence of video fields from the source 26 enters (44) the graphics controller 30 through the video capture unit 16 at a source frame rate, e.g., 60 Hz (60 frames per second). The video capture unit 16 digitizes the incoming data and stores (46) each video field in the frame buffer 34, a series of buffers 40a–i arranged as a circular queue. A queue write pointer 42 sequentially and circularly points (48) to each buffer 40a–i starting at a buffer zero 40a in the frame buffer 34, directing the video capture unit 16 where to store (46) each video field. The first video field is stored (46) in buffer zero 40a, the second video field in buffer one 40b, and the ith video field in buffer i 40i. The queue write pointer 42 points (48) to the next buffer 40a–i in the frame buffer 34 after the video capture unit 16 stores (46) each video field. In this way, every other buffer 40a, c, e, g, i stores video fields of the same polarity while the intervening buffers 40b, d, f, h store video fields of the opposite polarity. When the video capture unit 16 captures the (i+1)th video field, the queue write pointer 42 wraps around to point (48) to buffer zero 40a and the (i+1)th video field is stored in buffer zero 40a, overwriting the previously stored data. Because of this circular frame buffer structure, the even and odd video fields may be stored in different alternating buffers 40 on different passes through the frame buffer 34 depending on the value of i. As long as the source 26 has more video fields to send to the video capture unit 16, the video fields continue (50) to enter (44) the video capture unit 16.

Figure 4:
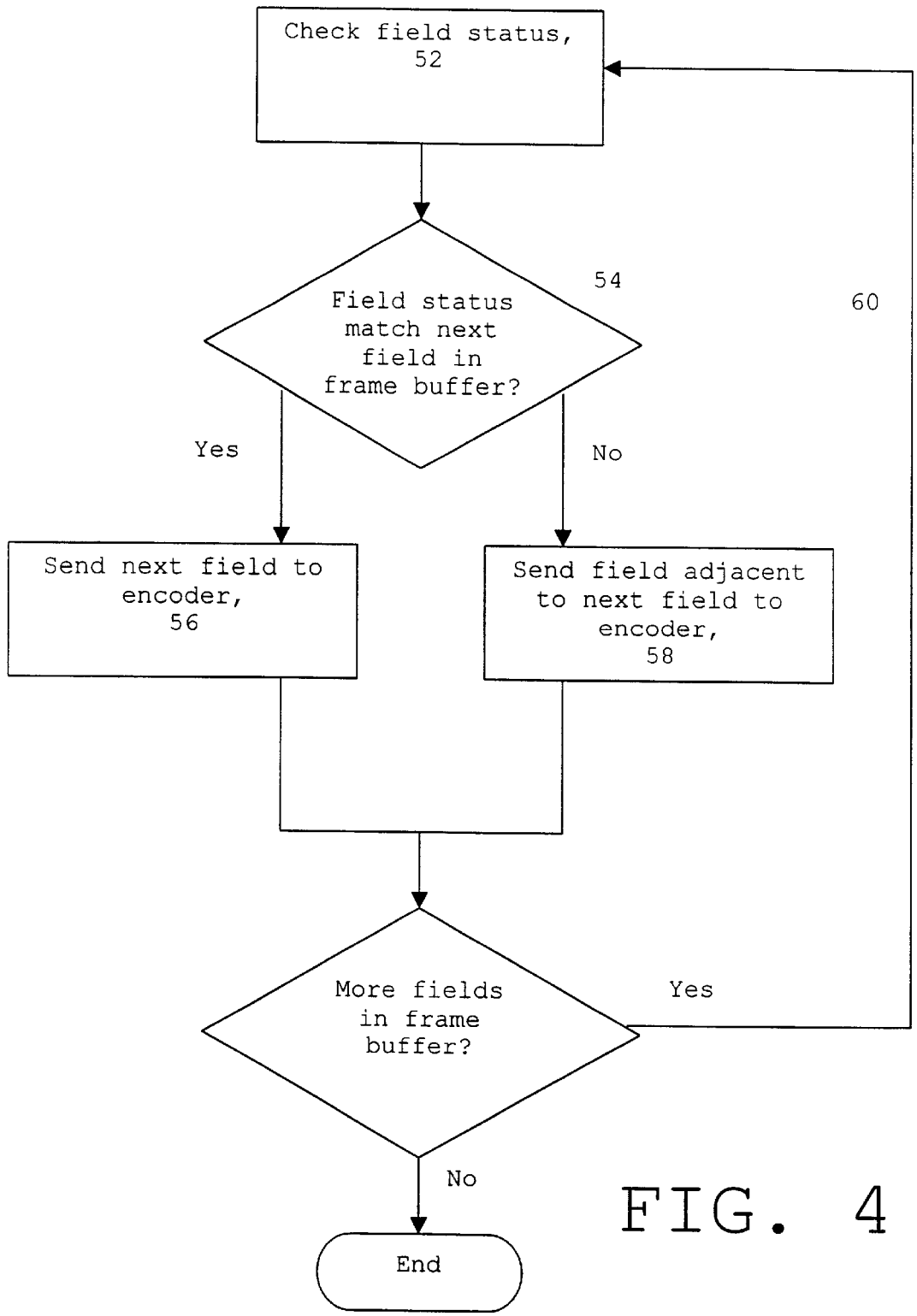
FIG. 4 is a flowchart showing a process of sending video fields for display.

Referring to FIGS. 2 and 4, when the display pipe 36 begins to display a video field, it first checks (52) the field status coming from the encoder 38, which may be an internal or an external component such as a television encoder chip to the graphics controller 30. The encoder 38 maintains its own timing and can indicate field status by alternately switching the state of a register bit included in the display pipe 36, possibly the same register used to enable the field locking feature of the graphics controller 30. If the field status polarity sent by the encoder 38 matches (54) the polarity of the next undisplayed video field, video field n, in the frame buffer 34, then the display pipe 36 will send (56) video field n to the encoder 38. If, however, the polarities do not match (54), the display pipe 36 will send (58) video field (n−1) to the encoder 38. If the source 26 has slower timing than the encoder 38, video field n is likely to be the most recently captured video field. The display pipe 36 continues (60) checking (52) the field status coming from the encoder 38 as long as undisplayed video fields remain in the frame buffer 34. The following table shows the possible cases the display pipe 36 may encounter and the resulting displayed field:

|  | Field Status | Current Video Field n | Displayed Video Field |
|---|---|---|---|
| Case 1 | Even | Even | n |
| Case 2 | Even | Odd | n − 1 |
| Case 3 | Odd | Even | n − 1 |
| Case 4 | Odd | Odd | n |

If the encoder 38 and the source 26 have the same frame rate, the current video field n should match the field status of the encoder 38, and the display pipe 36 will only encounter cases one and four. When the encoder 38 expects stored video fields at a frame rate that is different from the source frame rate, some stored video fields will be displayed more than once, meaning that the display pipe 36 may encounter any of the four cases. Cases two and three represent the situation where the display pipe 36 sends the encoder 38 a previously stored and displayed video field because one of the frame rates lags behind the other. If the display frame rate is faster, cases two and three signify that the video capture unit 32 has not yet received the next video field from the source 26. If the source frame rate is faster, cases two and three signify that the encoder 38 is not ready for another video field. With the implementation shown in the table, the timing of the video source 26 and the timing of the encoder 38 can remain independent of each other.

Once the encoder 38 receives the video field n or video field (n−1) from the display pipe 36, it performs a digital to analog conversion on the video field to put it in displayable form. The encoder 38 may send the analog video field as an NTSC (National Television Standards Committee) signal to the display device 28. If the display device 28 is a television, the NTSC signal may be directly displayed, but if it is a computer monitor, a video adaptor may be necessary to convert the NTSC signal to a computer-readable signal.

Other embodiments are within the scope of the following claims.

What is claimed is:

1. A method comprising:
   storing video fields at locations in a buffer relative to a write selector,
   determining which video field polarity a video display is in a state to display; and
   choosing from a location in the buffer, the location being relative to a read selector, the read selector being independent from the write selector, a next stored video field for display if the polarity of the next stored video field matches the determined state and otherwise choosing a stored video field adjacent to the next stored video field.

2. The method of claim 1 further comprising repeating the determining and choosing until all stored video fields have been chosen at least once.

3. The method of claim 1 wherein the buffer is a frame buffer.

4. The method of claim 3 in which storing the video fields in the frame buffer and determining which of at least two video field polarities the video display is in a state to display occur at different rates.

5. An article comprising a machine-readable medium, which stores machine-executable instructions, the instructions causing a machine to:
   store video fields at locations in a buffer relative to a write selector,
   determine which video field polarity a video display is in a state to display; and
   choose from a location in the buffer, the location being relative to a read selector, the read selector being independent from the write selector, a next stored video field for display if the polarity of the next stored video field matches the determined state and otherwise choosing a stored video field adjacent to the next stored video field.

6. The article of claim 5 further causing the machine to repeat the determining and choosing until all stored video fields have been chosen at least once.

7. The article of claim 5 wherein the buffer is a frame buffer.

8. The article of claim 7 wherein storing the video fields in the frame buffer and determining which of at least two video field polarities the video display is in a state to display occur at different rates.

9. An apparatus comprising:
   a buffer having a read selector and a write selector, the read selector controlled independent from the write selector,
   an encoder that indicates a field status of a display device; and
   a display pipe that sends a stored video field from a location in the buffer relative to the write selector to the encoder based on the field status indicated by the encoder, the display pipe sending a next stored video field if the field status of the next stored field matches the field status indicated by the encoder and otherwise sending a stored video field adjacent to the next stored video field.

10. The apparatus of claim 9 further comprising a video capture unit that captures a sequence of video fields.

11. The apparatus of claim 9 wherein the buffer is a circular frame buffer for storing the video fields.

12. The apparatus of claim 9 in which the encoder is an external device in relation to the display pipe.

13. The apparatus of claim 9 further comprising an integrated circuit embodying the encoder and the display pipe.

14. A system comprising:
- a video capture unit configured to capture a sequence of video fields;
- a frame buffer having a read selector and a write selector, the read selector controlled independent from the write selector and being configured to store each video field in the sequence of video fields;
- a display pipe configured to check a field status of an encoder and send a stored video field from a location in the frame buffer relative to the write selector based on the field status indicated by the encoder, the display-pipe sending a next stored video field if the field status of the next stored field matches the field status indicated by the encoder and otherwise sending a stored video field adjacent to the next stored video field.

15. The system of claim 14 in which the video capture unit, the frame buffer, and the display pipe are located in a graphics controller unit.

16. The system of claim 15 in which the encoder is located in the graphics controller unit.

17. The system of claim 15 in which the encoder is located external to the graphics controller unit.

18. The system of claim 14 further comprising a display device configured to display the stored video field received by the encoder.

19. The system of claim 14 further comprising a frame buffer configured to store the video fields.

20. The system of claim 19 in which the frame buffer is located in a graphics controller unit.

* * * * *